US010095999B2

(12) United States Patent
De et al.

(10) Patent No.: US 10,095,999 B2
(45) Date of Patent: Oct. 9, 2018

(54) MANAGING MULTIPLE TASKS OF A PROJECT PLAN VIA A TASK MANAGEMENT TOOL

(71) Applicant: ORACLE INTERNATIONAL CORPORATION, Redwood Shores, CA (US)

(72) Inventors: Niladri De, Telangana (IN); Srinivasu Dudala, Telangana (IN); Mani Kumar V R A N Kasibhatla, Telangana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 851 days.

(21) Appl. No.: 14/546,098

(22) Filed: Nov. 18, 2014

(65) Prior Publication Data
US 2016/0140502 A1 May 19, 2016

(51) Int. Cl.
G06Q 10/00 (2012.01)
G06Q 10/10 (2012.01)
G06Q 10/06 (2012.01)

(52) U.S. Cl.
CPC ..... G06Q 10/103 (2013.01); G06Q 10/06316 (2013.01)

(58) Field of Classification Search
CPC combination set(s) only.
See application file for complete search history.

(56) References Cited

U.S. PATENT DOCUMENTS

| 5,440,681 | A | * | 8/1995 | Kudo | G06F 17/246 345/440 |
| 5,721,847 | A | * | 2/1998 | Johnson | G06F 3/0481 715/209 |
| 6,674,450 | B1 | * | 1/2004 | Toub | G06F 9/4443 707/999.01 |
| 7,676,490 | B1 | | 5/2010 | Cassone et al. | |

(Continued)

FOREIGN PATENT DOCUMENTS

EP 1355246 A1 10/2003

OTHER PUBLICATIONS

"Evaluation of alternative glyph designs for time series data in a small multiple setting", J Fuchs, F Fischer, F Mansmann, E Bertini . . . —Proceedings of the . . . , 2013—dl.acm.org.*

(Continued)

Primary Examiner — Jonathan G Sterrett (57) ABSTRACT

Systems, methods, and other embodiments for providing management of tasks of a project plan associated with a computer application are described. In one embodiment, a task management tool is disclosed that is configured to generate a task rectangle for display in a task management view. The task rectangle is representative of a task of the project plan in a Cartesian plane format having two attribute axes. An attribute indicium is also generated for display at a first position within the task rectangle as determined by the intersection of two attribute values of the first task on each of the two attribute axes, respectively. At least one of the two attribute values may be modified by re-positioning the attribute indicium at a second position within the task rectangle. The two attribute values take on two attribute axes values of the Cartesian plane format that intersect at the second position.

17 Claims, 8 Drawing Sheets

(56) References Cited

U.S. PATENT DOCUMENTS

| | | | |
|---|---|---|---|
| 8,122,056 | B2 | 2/2012 | Ames et al. |
| 8,138,912 | B2 | 3/2012 | Singh et al. |
| 8,516,594 | B2 | 8/2013 | Bennett et al. |
| 2002/0149604 | A1* | 10/2002 | Wilkinson ........ G06F 17/30994 345/643 |
| 2004/0148566 | A1 | 7/2004 | Jaffar et al. |
| 2013/0103615 | A1 | 4/2013 | Mun |

OTHER PUBLICATIONS

Glyph—maps for visually exploring temporal patterns in climate data and models H Wickham, H Hofmann, C Wickham, D Cook—Environmetrics, 2012—Wiley Online Library.*

A taxonomy of glyph placement strategies for multidimensional data visualization MO Ward—Information Visualization, 2002—journals.sagepub.com.*

Time and tide wait for no diagram R Kosara, P Messner, S Miksch—Technical Report, 2001—researchgate.net.*

Information rich glyphs for software management data MC Chuah, SG Eick—IEEE Computer Graphics and . . . , 1998—ieeexplore.ieee.org.*

Excel Add-In for Manipulating Points on Charts (MPOC), by Diego Oppenheimer, on Nov. 2, 2009, retrieved from: https://blogs.office.com/en-us/2009/11/02/excel-add-in-for-manipulating-points-on-charts-mpoc/.*

Mediating Figures: Risk Mapping in Inter-organizational Project Control—Downloaded on May 29, 2014 from: http://business.cardiff.ac.uk/sites/default/files/ipa2012/Final_Version_IPA_Paper_Reference_73.docx; Paper submitted to the IPA Conference, Cardiff, 2012; (pp. 1-42).

Project Management Crumbs—Risk Qualitative Analysis. How Much Complicated?—Downloaded on May 29, 2014 from: http://pmcrumbs.blogspot.it/2012/11/risk-qualitative-analysis-how-much.html; Nov. 19, 2012; (pp. 1-3).

Project Management Crumbs—A Very Simple Tool for Portfolio Analysis—Downloaded on Jun. 3, 2014 from: http://pmcrumbs.blogspot.in/2013/01/a-very-simple-tool-for-portfolio.html; Jan. 31, 2013; (pp. 1-4).

Luis Copertari, Visualising Project Management Dimensions, Journal of Project, Program & Portfolio Management, vol. 3 No. 1; 2012 (pp. 1-9)—downloaded from file:///C:/Documents%20and%20Settings/Admin_2/My%20Documents/Downloads/2321-11496-1-PB.pdf; Autonomous University of Zacatecas, Mexico.

Grimaldi et al., (INTECH), A Framework to Select Techniques Supporting Project Risk Management—Downloaded from: http://cdn.intechopen.com/pdfs-wm/38979.pdf; (pp. 1-30).

Bubble Chart Pro Plus—Downloaded on Jun. 2, 2014 from: http://download.cnet.com/Bubble-Chart-Pro-Plus/3000-2076_4075764612.html; (pp. 1-7).

Interactive Cartesian Coordinates—Downloaded on Jun. 2, 2014 from: http://www.mathsisfun.com/data/cartesian-coordinates-interactive.html; (p. 1).

Podean et al. (INTECH), Risk Management in Collaborative Systems—downloaded from: http://cdn.intechopen.com/pdfs-wm-38986.pdf; 2012 (pp. 1-18).

* cited by examiner

MANAGING MULTIPLE TASKS OF A PROJECT PLAN VIA A TASK MANAGEMENT TOOL

BACKGROUND

Many different types of applications exist for managing projects. In some project management software applications, certain numerical attributes for a task associated with a project may be visually (pictorially) displayed in a non-numeric form (e.g., in a color-coded format) to a task planner or project manager (i.e., a user), and some may not be visually displayed in such a manner. For example, there may be several numerical attributes for a task, which are useful for a user to know, but which are usually not depicted visually. Instead, the values of such numerical attributes may simply be listed in numerical form. Just by seeing the numerical values for these attributes of different tasks, it may be very difficult for the user to perceive the nature, intensity, and veracity of the situation or context. It may be even more difficult for the user to correlate the visually depicted information with the numerically listed information.

For example, in one situation related to a project plan, a few high impact and high risk tasks may be getting delayed, and the finish deadline for these tasks may be getting close. In present day task/project management views, a user may visually simply understand that few tasks are getting delayed for which the finish-by dates are close. But the fact that many of these delayed tasks are also of high impact and high risk may be difficult for the user to correlate to the visually depicted information.

Alternate views may exist, where an additional attribute is depicted on a task bar as either color, shades of grey, a shading pattern, or a thickness/line-pattern of a border, etc. However, this kind of depiction is quantized at best, interpretation dependent (where a legend may be provided to indicate correspondence), and is severely limited in providing a visual "feel" of the matter. In other alternate views, such additional attributes may be written in numerals at pre-defined spaces on or adjacent to the task bar (e.g., at top-right hand corner, or at bottom center, etc.) on the task management view. In such cases, even though the information is available on the view, the information is numerically interpretation dependent and is devoid of the visual "feel".

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments for providing management of tasks of a project plan (e.g., a project plan for constructing a building) associated with a computer application are described. In one embodiment, a task management tool is disclosed that is configured to generate a task rectangle for display in a task management view. The task rectangle is representative of a task (e.g., pouring a foundation of the building) of the project plan in a Cartesian plane format having two attribute axes. Each attribute axis defines a continuum of attribute values corresponding to a task attribute such as, for example, priority, impact, risk, and return on investment. Other task attributes are possible as well, in accordance with other embodiments.

Examples of Task Attributes

In this disclosure, various task attributes are implemented by the present system. For purposes of explanation, some examples of task attributes are as follows:

In one embodiment, the priority task attribute refers to the importance of the task. For example, it may be useful to complete the task on time, otherwise other tasks will be negatively affected. Alternatively, the task may be able to be completed at any of multiple times during the project, thereby making the task of low importance and low priority.

In one embodiment, the impact task attribute refers to the negative effect that not completing the task on time would have on the project and/or the resource (e.g., a contractor) working on the project. For example, not completing the task on time may negatively affect the reputation of the resource working on the project such that that resource may not be provided with future work. Thus, such an impact would be considered high.

In one embodiment, the risk task attribute refers to the likelihood that the task may run into trouble and be delayed, or be further delayed if already delayed. For example, the task may be depending on the shipment of equipment to the job site that cannot be obtained elsewhere. If the equipment is currently being shipped across the Atlantic Ocean and a hurricane is forming in the Atlantic Ocean, the risk may be considered very high with respect to completing the task on time.

In one embodiment, the return-on-investment (ROI) task attribute refers to the financial gain (or some other gain such as good will) to be made by completing the task on time. For example, if a resource (e.g., a contractor) figures that he is going to break even with respect to completing the task, the ROI may be considered to be zero. For other tasks, the ROI may be positive (e.g., corresponding to a profit) or negative (e.g., corresponding to a loss).

An attribute indicium is also generated for display at a first position within the task rectangle as determined by the intersection of two attribute values of the first task on each of the two attribute axes, respectively. At least one of the two attribute values may be modified (e.g., updated) by re-positioning the attribute indicium at a second position within the task rectangle. In this manner, the two attribute values take on two attribute axes values of the Cartesian plane format that intersect at the second position.

In one embodiment, task rectangles are represented as Cartesian (x-y) value planes (Cartesian plane formats). The bottom edge is the x-axis and is parallel to the timeline of the task. The left edge is the y-axis and is perpendicular to the timeline of the task. An indicium (shown as a thick, prominent, circled dot) is shown on the body of the task rectangle to denote the two numerically bounded (meaning has a maximum value and a minimum value) task attribute values for that task.

Example embodiments are discussed herein with respect to computerized project plan management (PPM), where individual tasks are defined and are to be executed over a determined time period. In one embodiment, individual tasks are represented in a task management view provided by a graphical user interface of a project planning computer application running on a computing device. The task management view allows a user to view various aspects of the displayed tasks (e.g., assigned resources, timelines, percent resource allocation, task attributes, percent completion) and manipulate one or more of those displayed aspects. Furthermore, other embodiments may be implemented as part of any computer application for managing tasks or work using a graphical user interface.

Figure 1:
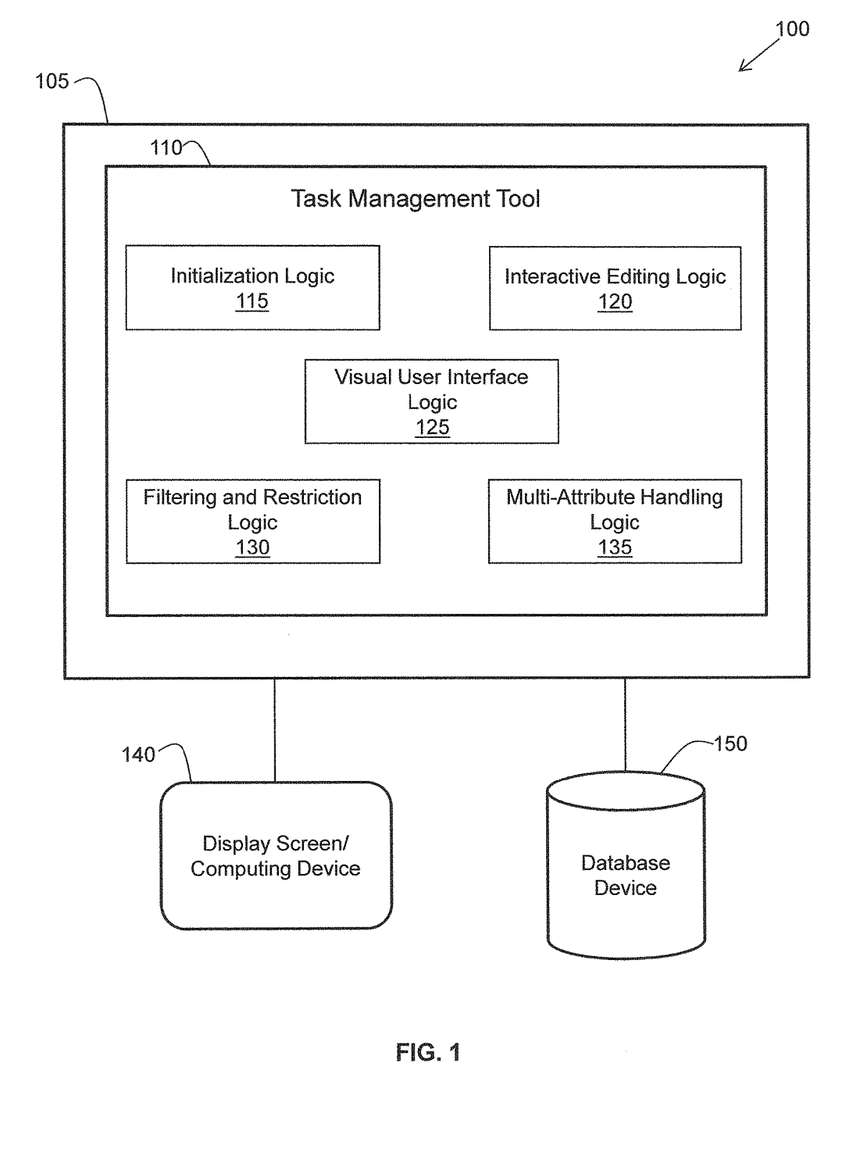
FIG. 1 illustrates one embodiment of a computer system, having a computing device configured with a task management tool.

FIG. 1 illustrates one embodiment of a computer system 100, having a computing device 105 configured with a task management tool 110. For example, in accordance with one embodiment, the task management tool 110 may be part of a project planning computer application of a company, configured to facilitate the managing of multiple tasks of a project plan. In accordance with one embodiment, a graphical user interface is provided by the project planning computer application (e.g., by a visual user interface logic of the task management tool 110).

In one embodiment, the project planning computer application may comprise construction management software for a construction company. The software and computing device 105 may be configured to operate with or be implemented as a cloud-based networking system, a software-as-a-service (SaaS) architecture, or other type of computing solution. For example, in one embodiment, the graphical user interface may be implemented as a browser, where the graphical user interface is viewed and manipulated within a browser window of a client. Other logics and data associated with the computer system 100 may reside on a remote server machine. Communication between the browser and the remote server machine may occur over the internet network cloud, for example (see FIG. 8).

With reference to FIG. 1, in one embodiment, the task management tool 110 is implemented on the computing device 105 and includes a plurality of logics for implementing various functional aspects of the task management tool 110. In one embodiment, the task management tool 110 includes an initialization logic 115, an interactive editing logic 120, a visual user interface logic 125, a filtering and restriction logic 130, and a multi-attribute handling logic 135.

However, other embodiments may provide different logics or combinations of logics that provide the same or similar functionality as the task management tool 110 of FIG. 1. In one embodiment, the task management tool 110 is an executable application including algorithms and/or program modules configured to perform the functions of the logics. The application is stored in a non-transitory medium.

The computer system 100 also includes a display screen 140 operably connected to the computing device 105. In accordance with one embodiment, the display screen 140 is used to display views of and facilitate user interaction with a graphical user interface (GUI) provided by the visual user interface logic 125 for task management. In one embodiment, the task management tool 110 is a centralized server-side application that is accessed by many users. Thus the display screen 140 may represent multiple computing devices/terminals that allow users to access and receive services from the task management tool 110 via networked computer communications.

In one embodiment, the computer system 100 further includes at least one database device 150 operably connected to the computing device 105 or a network interface to access the database device 150 via a network connection. In accordance with one embodiment, the database device 150 is configured to store and manage data records (e.g., records of tasks) associated with the task management tool 110 in a database system (e.g., a program plan computer application).

Referring back to the logics of the task management tool 110 of FIG. 1, in one embodiment, the visual user interface logic 125 is configured to at least provide a graphical user interface (GUI) associated with a project planning computer application. For example, the visual user interface logic 125 includes program code that generates and causes the graphical user interface to be displayed based on an implemented graphical design of the interface. For example, in response to user actions and selections via the GUI, associated aspects of tasks of a project plan may be edited and manipulated.

The visual user interface logic 125 is also configured to facilitate the displaying, on the display screen 140, of task rectangles associated with tasks and attribute indicia within the task rectangles in a task management view of the project planning computer application. The visual user interface logic 125 is also configured to facilitate user modification of positions of the attribute indicia within the task rectangles.

A task rectangle graphically illustrates a task in a task management view. For example, a width of a task rectangle may span a determined period of time (e.g., 5 days) over which an associated task is to be performed. A height of a task rectangle may visually depict an amount (e.g., a percentage) of a resource that is allocated to the associated task. In one embodiment, a task rectangle is in a Cartesian plane format having two attribute axes. For example, a horizontal axis may represent priority of the associated task, and a vertical axis may represent an impact of the associated task. Various examples of such task rectangles are elaborated on later herein with respect to subsequent figures along with examples of related task management functionality.

An attribute indicium graphically illustrates a pair of task attribute values in task rectangle of a task management view. For example, an associated task may have a priority value of 9 on a scale (e.g., a horizontal attribute axis of a Cartesian plane format) of 0 to 10. The associated task may also have an impact value of 2 on a scale (e.g., a vertical attribute axis of the Cartesian plane format) of 0 to 5. As a result, an associated attribute indicium (e.g., displayed as a prominent dot) will be displayed in the Cartesian plane of the associated task rectangle at the coordinates of (9, 2), thus providing a visual indication of the priority and impact of the associated task. Various examples of such task attribute indicia are elaborated on later herein with respect to subsequent figures along with examples of related task management functionality.

The GUI provided by the visual user interface logic 125 is configured to allow a user (e.g., a project planner or a task manager) to view, manage, and manipulate such task rectangles and task attribute indicia for multiple tasks in a task management view. Various examples of the interface are elaborated on later herein with respect to subsequent figures along with examples of associated task management functionality.

In one embodiment, the initialization logic 115 is configured to initialize the positions of the attribute indicia to default positions within the task rectangles when attribute values of the attribute indicia are otherwise unspecified. For example, the initialization logic 115 may place a position of an attribute indicium at the center of a task rectangle by default. The initialization logic 115 is also configured to initialize the task management view to a default format not having the task rectangles or the attribute indicia when sizes of the task rectangles are determined to be too small (e.g., smaller than one or more defined threshold values). For example, such default formats may include a tabular format or a textual format.

In one embodiment, the interactive editing logic 120 is configured to dynamically update attribute values associated with the tasks in response to user modification of positions of the attribute indicia within Cartesian plane formats of the task rectangles. For example, referring again to the attribute indicium at a position of (9, 2) within the Cartesian plane format of a task rectangle, the indicium may be moved by a user via the graphical user interface (e.g., using a mouse, or using a finger on a touchscreen display) to a position of (7, 2). In this manner, the interactive editing logic 120 responds to the user interaction by updating the priority attribute value of the associated task from a value of 9 to a value of 7. The impact attribute value remains at a value of 2. Various examples of updating values of such task attribute indicia are elaborated on later herein with respect to subsequent figures.

In one embodiment, the filtering and restriction logic 130 is configured to generate a bounded attribute area for which task rectangles that have attribute indicia within the bounded attribute area are displayed in the task management view. That is, tasks are filtered out of the task management view that do not have attribute indicia within the bounded attribute area. In this context, the visual user interface logic 125 is configured to facilitate generation of a filter contour for display within a task rectangle in response to user interaction with the GUI. The filter contour visually defines the bounded attribute area to be generated by the filtering and restriction logic 130. Various examples of such filtering are elaborated on later herein with respect to subsequent figures.

Furthermore, in one embodiment, the filtering and restriction logic 130 is configured to restrict at least one of two attribute values associated with an attribute indicium to one of a determined value or a determined range of values along a corresponding attribute axis of a Cartesian plane format of a task rectangle. For example, referring again to the attribute indicium at a position of (9, 2) within the Cartesian plane format of a task rectangle, the priority value may be restricted to values between 7 and 10 by the filtering and restriction logic 130. Therefore, in such an example, the interactive editing logic 120 is restricted by the filtering and restriction logic 130 (i.e., a user cannot move the associated attribute indicium below a value of 7 along the priority axis of the Cartesian plane format).

In one embodiment, the multi-attribute handling logic 135 is configured to change, in response to user interaction with the GUI, an attribute axis of a Cartesian plane format of a task rectangle to be representative of a different attribute of a task associated with the task rectangle. For example, referring again to the attribute indicium at a position of (9, 2) within the Cartesian plane format of a task rectangle, a user may click on (e.g., using a computer mouse) the priority axis of the Cartesian plane format. In response, the multi-attribute handling logic 135 may change the priority axis to a return-on-investment (ROI) axis spanning a range of values between −1 and 1. The priority/impact attribute indicium, having a position of (9, 2), is replaced by a ROI/impact attribute indicium having, for example, a position of (−0.5, 2) in the new Cartesian plane format representing ROI and impact.

The multi-attribute handling logic 135 is also configured to generate a plurality of attribute indicia to be displayed simultaneously in a same task rectangle. The logic 135 may apply a displayed Cartesian plane format to the same task rectangle corresponding to a user-selected attribute indicium of the plurality of attribute indicia. When the user selects a different attribute indicium of the plurality of attribute indicia, the Cartesian plane format of the same task rectangle may correspondingly change.

For example, both a priority/impact attribute indicium and an ROI/risk attribute indicium may be displayed in a same task rectangle. The Cartesian plane format of priority and impact may initially be displayed for the task rectangle, providing a clear visual indication of the task attributes of priority and impact. A user may then click on the displayed ROI/risk attribute, causing the multi-attribute handling logic 135 to change the Cartesian plane format axes to ROI and risk, respectively. The priority/impact attribute indicium is still displayed, but now has less visual meaning. A clear visual indication of the task attributes of ROI and risk are now shown. Attribute indicia may be distinguished based on, for example, color and/or shape.

Figure 2:
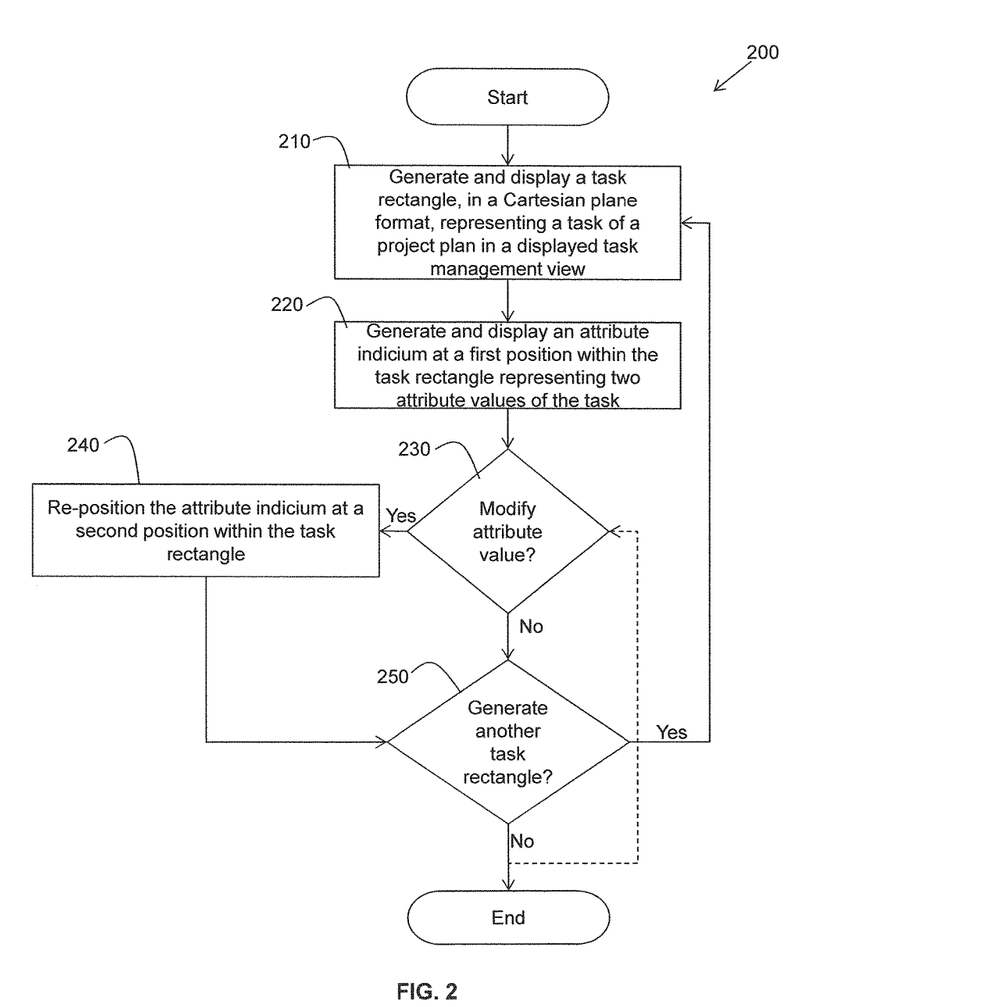
FIG. 2 illustrates one embodiment of a computer-implemented method, performed by the task management tool of the computer system of FIG. 1, for managing tasks of a project plan.

FIG. 2 illustrates one embodiment of a computer-implemented method 200, performed by the task management tool 110 of the computer system 100 of FIG. 1, for managing tasks of a project plan. Method 200 is implemented to be performed by the task management tool 110 of FIG. 1, or by a computing device configured with an algorithm of the method 200. Method 200 will be described from the perspective that tasks get generated by the task management tool 110 of the computer system 100 of FIG. 1. However, some tasks may pre-exist, for example, in the database device 150 and can be accessed by the task management tool 110 to be viewed and updated. Furthermore, in accordance with one embodiment, the functions of one or more of the various blocks of method 200 are initiated by a user via the graphical user interface.

Upon initiating method 200, at block 210, a first task rectangle is generated and displayed in a task management view of the task management tool 110 on the display screen 140. The first task rectangle represents a first task of a project plan in a Cartesian plane format having two attribute axes. In one embodiment, the task management tool 110 is associated with a computer application running on the computing device 105, and the first task rectangle is generated for display by the visual user interface logic 125 (e.g., in response to user interaction with the user interface).

At block 220, an attribute indicium is generated and displayed at a first position within the first task rectangle by determining an intersection of two attribute values. The two attribute values are associated with the first task, respectively, on each of the two attribute axes of the Cartesian plane format. For example, one attribute axis may represent a priority of the task and the other attribute axis may represent an impact of the task. In one embodiment, the attribute indicium is generated for display by the visual user interface logic 125 (e.g., in response to user interaction with the user interface).

At block 230, a decision is made with respect to modifying an attribute value of the attribute indicium or not. When the decision is to modify an attribute value of the attribute indicium (e.g., in response to user interaction with the user interface), method 200 proceeds to block 240. At block 240, the attribute indicium is re-positioned to a second position within the first task rectangle (e.g., by the visual user interface logic 125 in response to user interaction with the user interface). The two attribute values of the attribute indicium take on two attribute axes values of the Cartesian plane format that intersect at the second position within the first task rectangle. For example, in one embodiment, the interactive editing logic 120 dynamically updates the attribute values in response to the re-positioning.

When the decision at block 230 is not to modify an attribute value of the attribute indicium (e.g., in response to user interaction with the user interface) or when the attribute indicium has been re-positioned at block 240, method 200 proceeds to block 250. At block 250, a decision is made with respect to generating another task rectangle within the task management view or not. When the decision at block 250 is to generate another task rectangle, method 200 reverts back to block 210. Otherwise, method 200 ends or optionally reverts back to block 230. Examples of generating multiple task rectangles in the same task management view will be discussed herein with respect to subsequent figures.

In this manner, a task management view can be populated with a plurality of task rectangles representing a plurality of tasks. Each task may be associated with a pair of attributes represented by an attribute indicium positioned in a Cartesian plane format of an associated task rectangle to visually depict the pair of attributes. Values of the pair of attributes may be changed or updated by re-positioning the attribute indicium within the Cartesian plane format of the task rectangle.

Figure 3:
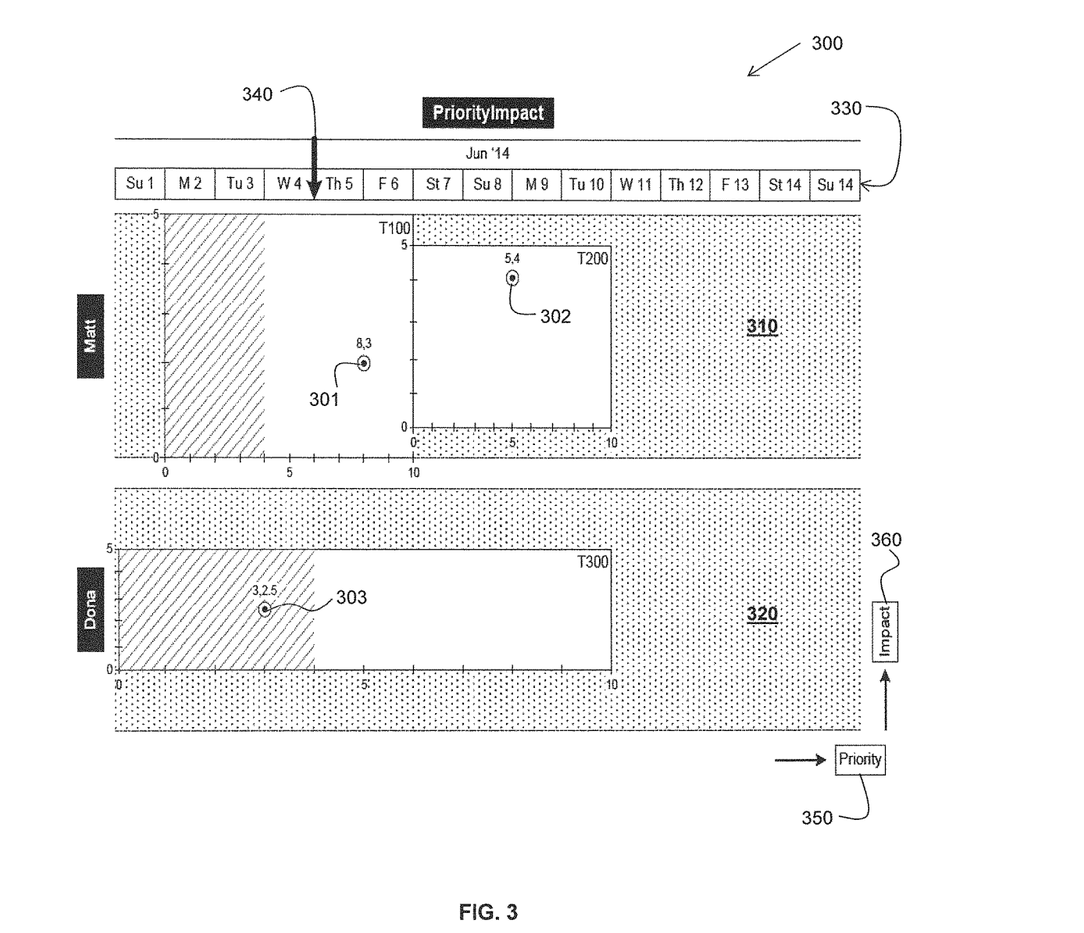
FIG. 3 illustrates one embodiment of a task management view provided by a graphical user interface of the task management tool of FIG. 1, and showing three tasks with attribute indicia corresponding to a pair of attribute types.

FIG. 3 illustrates one example embodiment of a task management view 300 provided by a graphical user interface of the task management tool 110 of FIG. 1, and showing three tasks with attribute indicia corresponding to a pair of attribute types. The first task is represented by task rectangle T100, the second task is represented by task rectangle T200, and the third task is represented by task rectangle T300. In one embodiment, the task rectangles are generated by visual user interface logic 125 in response to user interaction with the graphical user interface.

Task rectangle T100 and task rectangle T200 are assigned to resource channel 310, having Matt as the person (resource) responsible for working on and completing the associated tasks. Task rectangle T300 is assigned to resource channel 320, having Dona as the person (resource) responsible for working on and completing the associated task. Task rectangles T100 and T200 are displayed within the resource channel 310, and task rectangle T300 is displayed within the resource channel 320.

The extent of a task rectangle in the vertical direction within a corresponding resource channel indicates how much of the associated resource is allocated to the corresponding task, for example, on a daily basis. Referring to FIG. 3, the task associated with T100 is 100% allocated to Matt over a 5-day period (see the timeline 330 near the top of the view 300) corresponding to 40 hours of work (assuming 8 hours per day). The task associated with T200 is 75% allocated to Matt over a 4-day period corresponding to 24 hours of work. The task associated with T300 is 50% allocated to Dona over a 10-day period corresponding to 40 hours of work.

As per the latest data available, corresponding to Jun. 4, 2014, task T100 was planned to be started on June 2, finish on June 6 and, is 40% complete, and is running one day behind the planned schedule (see the shaded region within T100 with respect to the arrow 340 indicating the current day). Similarly, task T300 was planned to be started on June 1, finish on June 10, is 40% complete, and is running as per the planned schedule. Task T200, which is not started yet, is planned to start on June 7 and finish on June 10.

The numerical information described above for FIG. 3 is pictorially (visually) depicted. Start dates and finish dates are shown by the early or left edge and the late or right edge of the task rectangle, respectively. Duration, percent allocation, and work or effort are respectively shown by the width, height (with respect to resource channel height), and the surface area of a task rectangle. Resource assignment of a task is pictorially shown by placement of a task rectangle in the corresponding horizontal resource channel. Resource channel height denotes the daily capacity of the resource, and percentage completion is shown by the cross-shaded region within the task rectangle.

In one embodiment, each of the pictorially depicted aspects can be changed or edited visually and interactively by the user of the task management tool 110 via the graphical user interface. For example, any task's time-line location, length, or height of the task rectangle can be changed to respectively affect dates, duration, percent allocation (and hence effort) of the task. Also, by moving a task rectangle between resource channels, a user can change resource assignment. Furthermore, by changing the length of the cross-shaded region, a user can update the completion percentage as well.

Referring to FIG. 3, note that priority, impact, ROI, and risk are additional numerical task attributes which are pictorially (visually) depicted in the same task management view 300 with visual interactive edit ability, in accordance with one embodiment. Furthermore, each task rectangle's bottom and left (x and y) axes are marked with a scale of 0 to 10 (for priority) and 0 to 5 (for impact), respectively, defining a Cartesian plane format for each task. Furthermore, at the bottom right corner of the view 300, two arrows with attribute legends 350 and 360 are shown that specify which additional task attributes are depicted in the Cartesian plane formats (i.e., priority and impact in FIG. 3).

Referring again to FIG. 3, each task rectangle shows a task attribute indicium (301, 302, 303) as a circled and thick (prominent) dot positioned according to the values of the priority and impact attributes of the corresponding task. In one embodiment, the actual attribute values are also shown in text as a pair of numeric values, separated by a comma, proximate to the circled dots 301, 302, and 303. As seen in FIG. 3, the priority/impact values for task T100, T200, and T300 are (8, 3), (5, 4), and (3, 2.5) respectively. Furthermore, small graduation marks are shown on the axes of the Cartesian plane format for each task rectangle, providing visual guidance for a user. In one embodiment, the attribute indicia are generated by visual user interface logic 125 in response to user interaction with the graphical user interface.

In one embodiment, the circled prominent dot (i.e., task attribute indicium) is "draggable" or "moveable". By moving a task attribute indicium within a task rectangle from one position to another (e.g., using a computer mouse or a finger on a touchscreen display device), both priority and impact values can be changed (i.e., visually and interactively edited) for the task. In this manner, a user can easily view task attributes in a pictorial (visual) manner with respect to other pictorially (visually) depicted task aspects to gain a more complete view and understanding of the state of the tasks.

In one embodiment, the visual user interface logic 125 facilitates user modification of positions of the attribute indicia within the task rectangles. Also, in one embodiment, the interactive editing logic 120 dynamically updates attribute values in response to modifications of positions of the attribute indicia.

Figure 4:
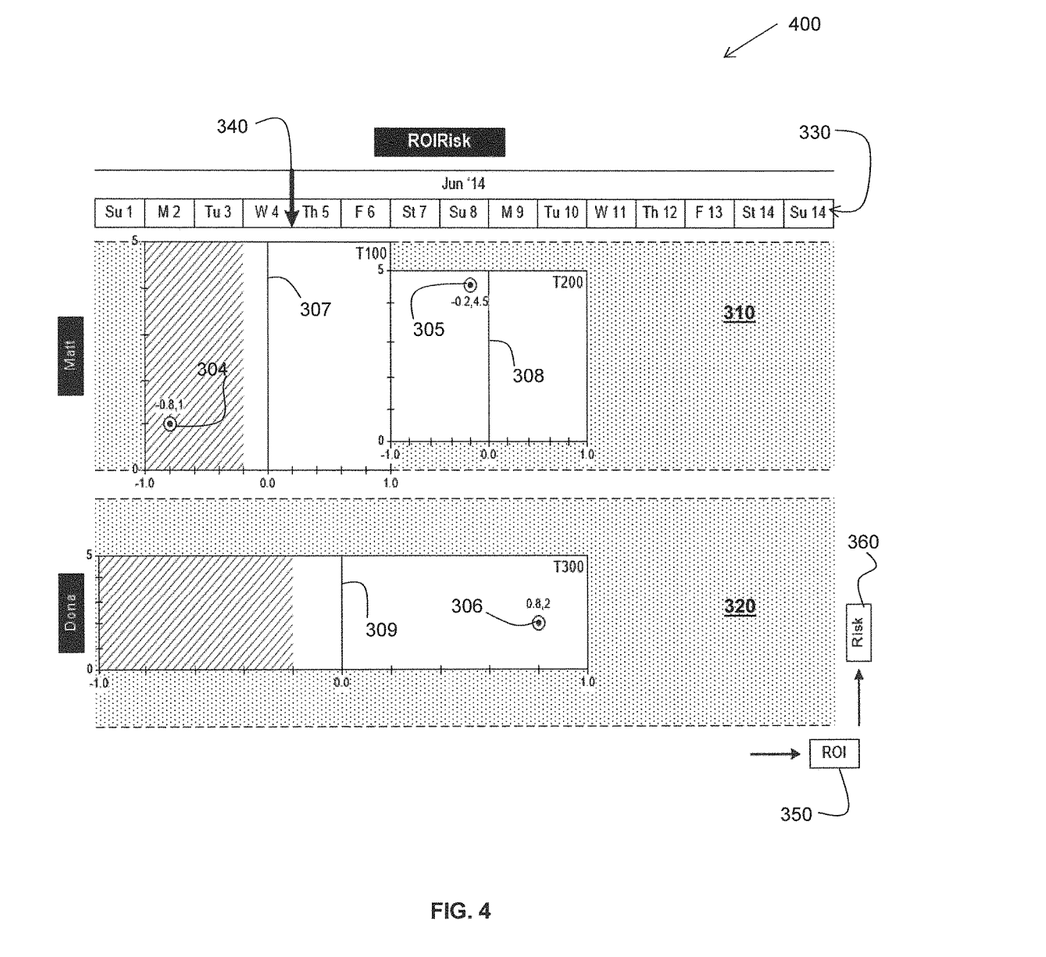
FIG. 4 illustrates another embodiment of a task management view provided by the graphical user interface of the task management tool of FIG. 1, and showing the three tasks of FIG. 3 with different attribute indicia corresponding to a pair of different attribute types.

FIG. 4 illustrates another embodiment of a task management view 400 provided by the graphical user interface of the task management tool 110 of FIG. 1, and showing the three tasks of FIG. 3 with different attribute indicia (304, 305, 306) corresponding to a pair of different attribute types. Instead of priority and impact, each Cartesian space of the task rectangles now shows an ROI axis (having values between −1 and 1) and a risk axis (having values between 0 and 5).

In one embodiment, a vertical line (307, 308, 309) is displayed in the middle of each task rectangle denoting a zero ROI line (i.e., ROI=0). The zero ROI line helps a user to visually distinguish between positive ROI space and negative ROI space within the task rectangle. Similar to the case with the priority/impact illustration in FIG. 3, the circled prominent dots (task attribute indicia) in each task rectangle of FIG. 4 pictorially depict the ROI and risk values for each task, along with a text label placed near the dot showing numerical values. As with the embodiment of FIG. 3, the circled prominent dot for each task allows for "dragging" to re-position the dot within the task rectangle, providing interactive visual editing of the ROI and risk values of each task.

The task rectangles T100, T200, and T300 of FIG. 4 are re-generated task rectangles. The task rectangles are re-generated in the sense that they represent the same tasks, but in a different Cartesian plane format (i.e., in a ROI/risk Cartesian plane format in FIG. 4). Other Cartesian plane formats corresponding to other pairs of task attributes are possible as well, in accordance with other embodiments.

For example, in accordance with one embodiment, a user may click on the attribute legend 350 to change the associated attribute to, for example, priority. The Cartesian plane format would then correspond to priority and risk. Instead, a user may click on the attribute legend 360 to change the associated attribute to, for example, impact. The Cartesian plane format would then correspond to ROI and impact.

Similarly, a user may click on each legend, changing the pair of attributes, and corresponding Cartesian plane formats, from ROI and risk to priority and impact as in FIG. 3. In this manner, a user may switch between various combinations of pairs of task attributes, in a same task management view. Again, this allows the user to view the task attributes in a pictorial (visual) manner with respect to other pictorially (visually) depicted task aspects to gain a more complete view and understanding of the state of the tasks. In one embodiment, the multi-attribute handling logic is configured to change an attribute axis of a Cartesian plane format of a task rectangle in cooperation with the visual user interface logic 125, in response to user interaction with the graphical user interface.

Figure 5:
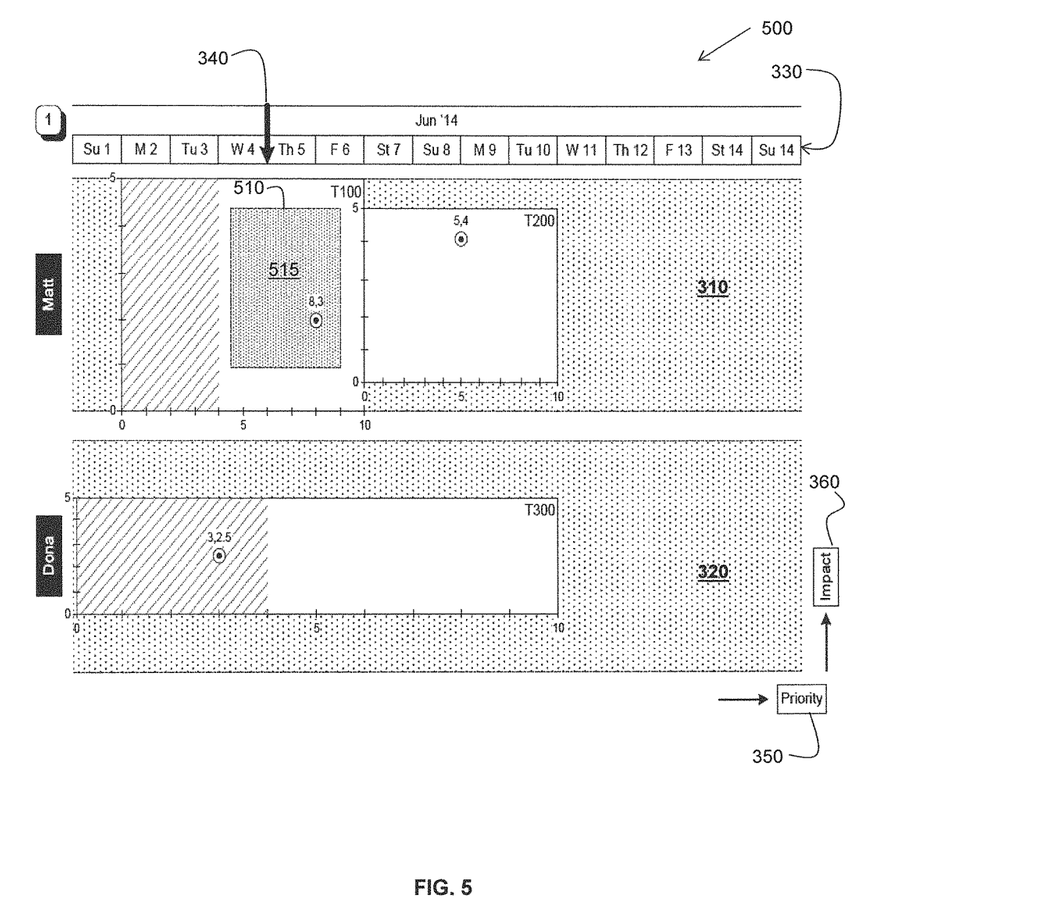
FIG. 5 illustrates another embodiment of a task management view provided by the graphical user interface of the task management tool of FIG. 1, and showing the three tasks of FIG. 3 with a created filter contour defining a bounded attribute area.

FIG. 5 illustrates yet another embodiment of a task management view 500 provided by the graphical user interface of the task management tool 110 of FIG. 1, and showing the three tasks of FIG. 3 with a created filter contour 510 defining a bounded attribute area 515. The rectangular filter contour 510 is illustrated as having been created in task rectangle T100. In one embodiment, the filter contour 510 may be drawn by a user via the graphical user interface via a computer mouse click-drag operation, a touch-drag operation, or by any other similar means. For example, in one embodiment, the visual user interface logic 125 facilitates the generation (e.g., drawing) of the filter contour 510 for display.

Also, in one embodiment, the filtering and restriction logic 130 generates the bounded attribute area 515 in response to generation of the filter contour 510. By generating the bounded attribute area 515, the filtering and restriction logic 130 limits the visual user interface logic 125 to displaying those tasks in the task management view having attribute indicia within the bounded attribute area 515.

In FIG. 5, the bounded attribute area 515 is defined by a range of priority values from 4.5 to 9 on the horizontal priority axis (x-axis), and a range of impact values from 1 to 4.5 on the vertical impact axis (y-axis). In accordance with one embodiment, task rectangles having attribute indicia that fall within the bounded attribute area 515 are displayed in the resource channels of the task management view as shown in FIG. 6.

Figure 6:
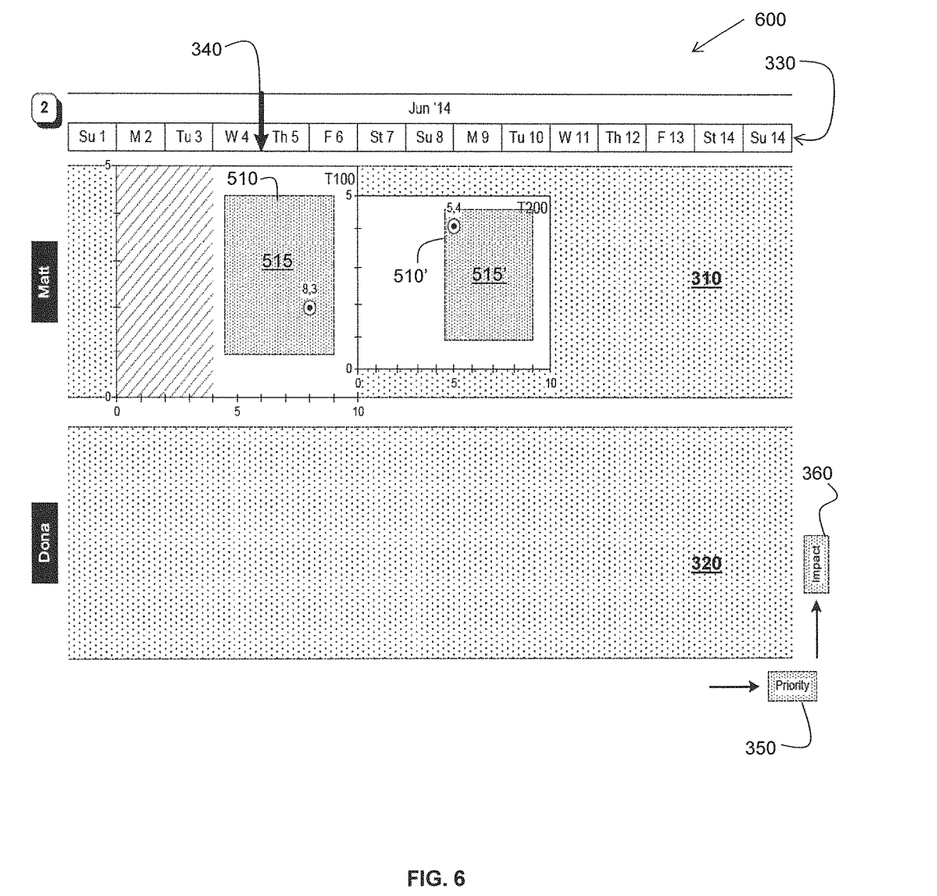
FIG. 6 illustrates another embodiment of a task management view provided by the graphical user interface of the task management tool of FIG. 1, and showing an effect of the created filter contour of FIG. 5.

For example, FIG. 6 illustrates still another embodiment of a task management view 600 provided by the graphical user interface of the task management tool 110 of FIG. 1, and showing an effect of the created filter contour 510 of FIG. 5. When the filter contour 510 is created for task rectangle T100, the filter contour 510 is automatically propagated to or duplicated in any other task rectangle within the task management view having attribute indicia that fall within the bounded attribute area 515.

As can be seen in FIG. 6, the filter contour 510 has been propagated to task rectangle T200 since T200 has an attribute indicium within the bounded attribute area 515. Even though the filter contour 510 was initially created for one task T100, it is automatically duplicated in or propagated to T200 as re-scaled filter contour 510' having re-scaled bounded attribute area 515'. That is, the filter contour 510 and bounded attribute area 515 of T100 has been automatically re-scaled in T200 to match the aspect ratio of the Cartesian plane format of T200.

Conversely, in FIG. 6, the task rectangle T300 and associated aspects and attributes are no longer displayed (i.e., they are hidden). This is because the attribute indicium for T300 falls outside of the bounded attribute area 515. Also, the legends 350 and 360 have been shaded to visually indicate that the view is filtered. In one embodiment, a user may select any displayed filter contour to modify the filter range by, for example, re-sizing the filter contour or deleting the filter contour to clear the filter.

In this manner, a user can define filter contours within various types of Cartesian plane formats to limit the task management view to those tasks having attributes within a limited range or area. Such filtering may be helpful to a user by allowing the user to view tasks having, for example, high priority and low impact, or high risk and high priority. This provides a user with flexibility to gain maximum insight into what is going on with a plan or project.

Even though embodiments have been disclosed herein having horizontal resource channels with a horizontal time axis, other embodiments may have vertical resource channels with a vertical time axis.

In accordance with one embodiment, the size of the task rectangles may be adjusted, via user interaction with the graphical user interface, to effectively zoom and un-zoom features along the time scale (e.g., to see less time span and more time span, respectively).

Even though two resource channels are shown in the embodiments disclosed herein, other embodiments may have more than two resource channels depicted in the graphical user interface. Furthermore, scrolling may be provided when all of the resource channels do not fit in the display real-estate.

Computing Device Embodiment

Figure 7:
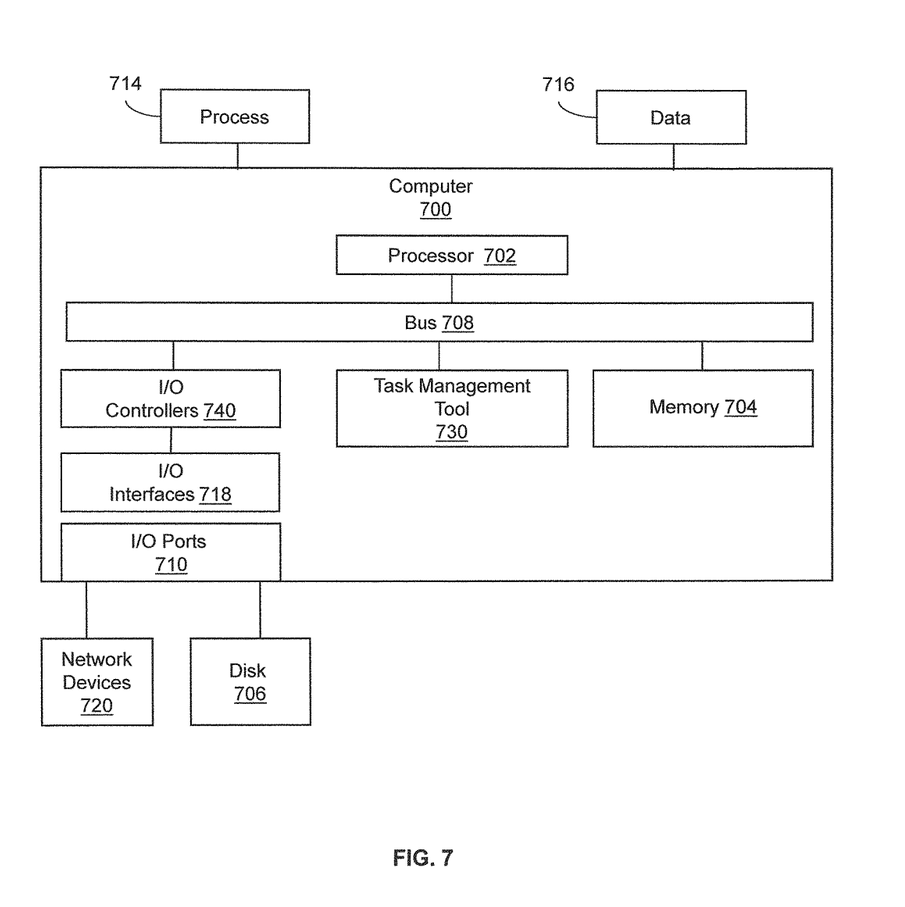
FIG. 7 illustrates one example embodiment of a computing device upon which the task management tool of the computing system of FIG. 1 may be implemented.

FIG. 7 illustrates an example computing device that is configured and/or programmed with one or more of the example systems and methods described herein, and/or equivalents. FIG. 7 illustrates one example embodiment of a computing device upon which an embodiment of a task management tool may be implemented. The example computing device may be a computer 700 that includes a processor 702, a memory 704, and input/output ports 710 operably connected by a bus 708. In one example, the computer 700 may include task management tool 730 configured to facilitate the management of tasks of a project plan similar to task management tool 110 shown in FIG. 1. In different examples, the tool 730 may be implemented in hardware, a non-transitory computer-readable medium with stored instructions, firmware, and/or combinations thereof. While the tool 730 is illustrated as a hardware component attached to the bus 708, it is to be appreciated that in other embodiments, the tool 730 could be implemented in the processor 702, stored in memory 704, or stored in disk 706.

In one embodiment, tool 730 or the computer 700 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the management of tasks of a project plan. The means may also be implemented as stored computer executable instructions that are presented to computer 700 as data 716 that are temporarily stored in memory 704 and then executed by processor 702.

Tool 730 may also provide means (e.g., hardware, non-transitory computer-readable medium that stores executable instructions, firmware) for facilitating the management of tasks of a project plan.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

Networked Browser-Based Embodiment

Figure 8:
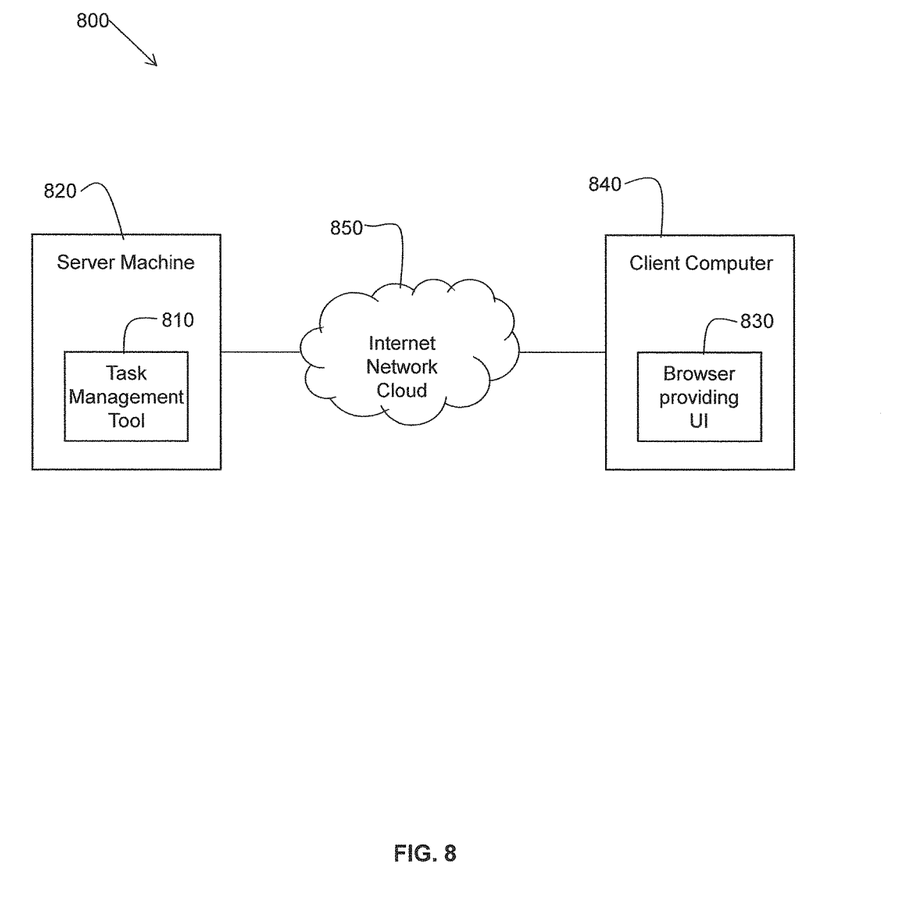
FIG. 8 illustrates one example embodiment of a network-based system providing access to a task management tool through a client browser.

FIG. 8 illustrates one example embodiment of a network-based system 800 providing access to a task management tool through a client browser. The system 800 includes a task management tool 810 residing on a server machine 820. The system 800 also includes a client browser 830 residing on a client computer 840. In one embodiment, the client computer 840 is located remotely from the server machine 820. The client computer 840 communicates with the server machine 820 over the internet network cloud 850.

In accordance with one embodiment, the task management tool 810 is similar to the task management tool 110 of FIG. 1. However, the graphical user interface associated with the task management tool 810 is implemented as part of the browser 830, where the graphical user interface is viewed and manipulated within a browser window on the client computer 840. In this manner, many client computers having browsers with the same or different graphical user interfaces may remotely access the same task management tool.

Systems and methods have been described herein which provide a visual depiction of attributes of tasks in a task management view. By providing such a visual depiction, the attributes may be easily correlated to other visually depicted information in the task management view thereby allowing a user to perceive the nature, intensity, and veracity of the situation or context of one or more associated tasks.

Embodiments of systems and methods have been described herein that provide for employing a task rectangle as a Cartesian value plane to visually show additional task attributes in a task management view. Visual interactive editing of the additional task attributes is also provided via, for example, simple drag and drop techniques. Visual interactive filtering is also provided for the additional task attributes via the drawing of, for example, a filter rectangle on the body of a task rectangle.

In one embodiment, the x-axis (horizontal attribute axis), where the y attribute axis value is zero, does not have to be the bottom edge of the task rectangle. The x-axis may be the top edge of the task rectangle or an intermediate line parallel to the top and bottom edges of the task rectangle, depending on the attribute range. For example, when the y axis attribute value varies from 10 to 100, the x-axis (where y=0) may not be present on the task rectangle at all. Similar reasoning may apply for the y-axis (where x=0) as well.

In one embodiment, prominent dots are employed to provide visualization of additional task attributes without obstructing the interactive visualization of other attributes. Visual management of large numbers of additional attributes may be provided using multi-colored or multi-shaped prominent dots, or both. Each separate dot is associated with a separate x-y scale (Cartesian plane format) and, therefore, the scale and graduation marks follow the "selected" dot.

In one embodiment, a task management view may show just one attribute instead of two. For example, the position of the prominent dot with respect to the breadth of the rectangle may not be counted. The position along the length denotes the additional attribute value.

Sometimes for a task, the value of one of the two attributes may not be known. As such, in one embodiment, a default value is assumed and the prominent dot is shown as corresponding to the default value. Furthermore, for any new task, the prominent dot may be initialized to ($x_{default}$, $y_{default}$) position.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method comprising:
generating a first task rectangle, within a task management tool associated with a computer application running on a computing device, wherein the first task rectangle represents a first task of a project plan, wherein a width of the first task rectangle represents a first attribute of the first task, and a height of the first task rectangle represents a second attribute of the first task;
displaying the first task rectangle in a task management view on a display screen;
configuring the width and the height of the first task rectangle to define two attribute axes in a Cartesian plane, wherein a first axis represents a range of values for a third attribute of the first task, and a second axis represents a range values for a fourth attribute of the first task;
generating an attribute indicium based on a value of the third attribute and a value of the fourth attribute to define a coordinate in the Cartesian plane within the first task rectangle;
displaying the attribute indicium at a first position within the first task rectangle based on the coordinate defined by the third attribute and the fourth attribute, wherein a relationship is visually shown for the four attributes based on the attribute indicium displayed within the first task rectangle;
configuring the attribute indicium to be movable on the display screen within the first task rectangle, wherein the attribute indicium is movable in response to a user action including an action of dragging the attribute indicium on the display screen; and
in response to the attribute indicium being moved by detecting the user action, (i) determining that the attribute indicium is moved to a second location within the first task rectangle, and (ii) modifying the value of the third attribute and the value of the fourth attribute to correspond to axis coordinates of the second location within the first task rectangle; and
generating a filter contour within the task management tool for display within the height and width of the first task rectangle in response to user interaction with a graphical user interface on the display screen associated with the task management tool, wherein the filter contour defines a bounded attribute area for which task rectangles having attribute indicia within the bounded attribute area are displayed within the task management view; and
displaying, on the task management view on the graphical user interface, a limited view of tasks having attributes within a limited range of the bounded attribute area.

2. The computer-implemented method of claim 1, wherein each attribute value of the third attribute value and the fourth attribute value represents a level of one of: a priority of the first task, an impact of the first task, a return on investment of the first task, or a risk of the first task.

3. The computer-implemented method of claim 1, further comprising:
generating a second task rectangle, within the task management tool, representing a second task of the project plan in the Cartesian plane format having the two attribute axes;
displaying the second task rectangle in the task management view;
generating a different attribute indicium within the task management tool;
displaying the different attribute indicium at a position within the second task rectangle by determining an intersection of two attribute values, associated with the second task, respectively on each of the two attribute axes of the Cartesian plane format; and
modifying at least one of the two attribute values associated with the second task by re-positioning the different attribute indicium, in response to user interaction with the graphical user interface associated with the task management tool, at a different position within the second task rectangle, wherein the two attribute values associated with the second task take on two attribute axes values of the Cartesian plane format that intersect at the different position within the second task rectangle.

4. The computer-implemented method of claim 1, further comprising:

re-generating the first task rectangle within the task management tool, wherein the re-generated first task rectangle represents the first task of the project plan in a different Cartesian plane format wherein the first axis is changed to represent a range of values of a fifth attribute of the first task, and the second axis is changed to represent a range of values of a sixth attribute of the first task;

displaying the re-generated first task rectangle in the task management view;

generating a different attribute indicium within the task management tool;

displaying the different attribute indicium at a first position within the re-generated first task rectangle by determining an intersection of the values of the fifth attribute and the sixth attribute associated with the first task, respectively on each of the two different attribute axes of the different Cartesian plane format; and modifying the values of the fifth attribute and the sixth attribute associated with the first task by re-positioning the different attribute indicium, in response to user interaction with the graphical user interface associated with the task management tool, at a second position within the re-generated first task rectangle, wherein the two different attribute values take on two different attribute axes values of the different Cartesian plane format that intersect at the second position within the re-generated first task rectangle.

5. The computer-implemented method of claim 1, further comprising initializing the first position to a default position within the first task rectangle when the values of the third attribute and the fourth attribute are unspecified.

6. The computer-implemented method of claim 1, further comprising restricting at least one of the values of the third attribute or the fourth attribute to one of a determined value or a determined range of values along a corresponding attribute axis of the first axis and the second axis.

7. The computer-implemented method of claim 1, further comprising initializing the task management view to a default format not having the first task rectangle or the attribute indicium when a size of the first task rectangle is determined to be smaller than at least one defined threshold value.

8. The computer-implemented method of claim 1, wherein the attribute indicium comprises at least one of a displayed prominent dot and a displayed pair of numeric values representing the values of the third attribute and the fourth attribute as the coordinate in the Cartesian plane.

9. A non-transitory computer-readable medium storing computer-executable instructions that are part of an algorithm that, when executed by a computer including a processor, cause the computer to:

generate a first task rectangle, within a task management tool associated with a computer application executing on the computer, wherein the first task rectangle represents a first task of a project plan, wherein a width of the first task rectangle represents a first attribute of the first task, and a height of the first task rectangle represents a second attribute of the first task;

display the first task rectangle in a task management view on a display screen;

configure the width and the height of the first task rectangle to define two attribute axes in a Cartesian plane, wherein a first axis represents a range of values for a third attribute of the first task, and a second axis represents a range values for a fourth attribute of the first task;

generate an attribute indicium based on a value of the third attribute and a value of the fourth attribute to define a coordinate in the Cartesian plane within the first task rectangle;

display the attribute indicium at a first position within the first task rectangle based on the coordinate defined by the third attribute and the fourth attribute, wherein a relationship is visually shown for the four attributes based on the attribute indicium displayed within the first task rectangle;

configure the attribute indicium to be movable on the display screen within the first task rectangle, wherein the attribute indicium is movable in response to a user action including dragging the attribute indicium on the display screen; and in response to the attribute indicium being moved by detecting the user action, (i) determine that the attribute indicium is moved to a second location within the first task rectangle, and (ii) modify the value of the third attribute and the value of the fourth attribute to correspond to axis coordinates of the second location within the first task rectangle; and generating a filter contour within the task management tool for display within the height and width of the first task rectangle in response to user interaction with a graphical user interface on the display screen associated with the task management tool, wherein the filter contour defines a bounded attribute area for which task rectangles having attribute indicia within the bounded attribute area are displayed within the task management view; and displaying, on the task management view on the graphical user interface, a limited view of tasks having attributes within a limited range of the bounded attribute area.

10. The non-transitory computer-readable medium of claim 9, wherein the instructions further comprise instructions configured for modifying at least one of the values of the third attribute and the fourth attribute by re-positioning the attribute indicium, in response to user interaction with a graphical user interface, at a second position within the first task rectangle, wherein the two attribute values take on two attribute axes values of the Cartesian plane that intersect at the second position within the first task rectangle.

11. The non-transitory computer-readable medium of claim 9, wherein the instructions further comprise instructions configured for:

generating a second task rectangle for display in the task management view, wherein the second task rectangle represents a second task of the project plan in the Cartesian plane having the two attribute axes; and generating a different attribute indicium for display at a position within the second task rectangle as determined by an intersection of two attribute values, associated with the second task, respectively on each of the two attribute axes of the Cartesian plane.

12. The non-transitory computer-readable medium of claim 11, wherein the instructions further comprise instructions configured for modifying at least one of the two attribute values associated with the second task by re-positioning the different attribute indicium, in response to user interaction with a graphical user interface, at a different position within the second task rectangle, wherein the two attribute values associated with the second task take on two attribute axes values of the Cartesian plane that intersect at the different position within the second task rectangle.

13. The non-transitory computer-readable medium of claim 9, wherein the instructions further comprise instructions configured for:
   re-generating the first task rectangle for display in the task management view, wherein the re-generated first task rectangle represents the first task of the project plan in a different Cartesian plane format having two different attribute axes; and
   generating a different attribute indicium for display at a second position within the re-generated first task rectangle as determined by an intersection of two different attribute values, associated with the first task, respectively on each of the two different attribute axes of the different Cartesian plane.

14. The non-transitory computer-readable medium of claim 13, wherein the instructions further comprise instructions configured for modifying at least one of the two different attribute values associated with the first task by re-positioning the different attribute indicium, in response to user interaction with a graphical user interface, at a third position within the re-generated first task rectangle, wherein the two different attribute values take on two different attribute axes values of the different Cartesian plane format that intersect at the second third position within the re-generated first task rectangle.

15. A computing system, comprising:
   a display screen;
   a processor coupled to the display screen and to at least one memory;
   a non-transitory computer-readable medium storing computer-executable instructions when executed by the processor cause the processor to:
      generate a first task rectangle, within a task management tool associated with a computer application executing on the computer, wherein the first task rectangle represents a first task of a project plan, wherein a width of the first task rectangle represents a first attribute of the first task, and a height of the first task rectangle represents a second attribute of the first task;
      display the first task rectangle in a task management view on a display screen;
      configure the width and the height of the first task rectangle to define two attribute axes in a Cartesian plane, wherein a first axis represents a range of values for a third attribute of the first task, and a second axis represents a range values for a fourth attribute of the first task;
      generate an attribute indicium based on a value of the third attribute and a value of the fourth attribute to define a coordinate in the Cartesian plane within the first task rectangle;
      display the attribute indicium at a first position within the first task rectangle based on the coordinate defined by the third attribute and the fourth attribute, wherein a relationship is visually shown for the four attributes based on the attribute indicium displayed within the first task rectangle;
      configure the attribute indicium to be movable on the display screen within the first task rectangle, wherein the attribute indicium is movable in response to a user action including dragging the attribute indicium on the display screen; and
      in response to the attribute indicium being moved by detecting the user action, (i) determine that the attribute indicium is moved to a second location within the first task rectangle, and (ii) modify the value of the third attribute and the value of the fourth attribute to correspond to axis coordinates of the second location within the first task rectangle; and
   generating a filter contour within the task management tool for display within the height and width of the first task rectangle in response to user interaction with a graphical user interface on the display screen associated with the task management tool, wherein the filter contour defines a bounded attribute area for which task rectangles having attribute indicia within the bounded attribute area are displayed within the task management view; and
   displaying, on the task management view on the graphical user interface, a limited view of tasks having attributes within a limited range of the bounded attribute area.

16. The computing system of claim 15, wherein each attribute value of the third attribute value and the fourth attribute value represents an attribute value for a priority of the first task, an impact of the first task, a return on investment of the first task, or a risk of the first task.

17. The computing system of claim 15, further comprising instructions that when executed by the processor cause the processor to:
   re-generate the first task rectangle within the task management tool, wherein the re-generated first task rectangle represents the first task of the project plan in a different Cartesian plane format wherein the first axis is changed to represent a range of values of a fifth attribute of the first task, and the second axis is changed to represent a range of values of a sixth attribute of the first task; and
   display the re-generated first task rectangle in the task management view on the display screen.

* * * * *

UNITED STATES PATENT AND TRADEMARK OFFICE
CERTIFICATE OF CORRECTION

PATENT NO. : 10,095,999 B2  
APPLICATION NO. : 14/546098  
DATED : October 9, 2018  
INVENTOR(S) : De et al.

Page 1 of 1

It is certified that error appears in the above-identified patent and that said Letters Patent is hereby corrected as shown below:

In the Specification

Column 2, Line 56, delete "that that" and insert -- that --, therefor.

In the Claims

Column 19, Line 23, Claim 14, after "at the" delete "second".

Signed and Sealed this  
Thirty-first Day of December, 2019

Andrei Iancu  
*Director of the United States Patent and Trademark Office*